United States Patent
Neumann

(10) Patent No.: US 9,654,485 B1
(45) Date of Patent: May 16, 2017

(54) ANALYTICS-BASED SECURITY MONITORING SYSTEM AND METHOD

(71) Applicant: FireEye, Inc., Milpitas, CA (US)

(72) Inventor: Justin Neumann, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/685,475

(22) Filed: Apr. 13, 2015

(51) Int. Cl.
  *G06F 11/00* (2006.01)
  *G06F 12/14* (2006.01)
  *G06F 12/16* (2006.01)
  *G08B 23/00* (2006.01)
  *H04L 29/06* (2006.01)
  *G06N 99/00* (2010.01)

(52) U.S. Cl.
  CPC ....... *H04L 63/1416* (2013.01); *G06N 99/005* (2013.01); *H04L 63/1441* (2013.01)

(58) Field of Classification Search
  CPC ............. H04L 63/1416; H04L 63/1425; H04L 63/1441; H04L 63/145; H04L 67/02
  USPC ......................................................... 726/23
  See application file for complete search history.

(56) References Cited

U.S. PATENT DOCUMENTS

| | | | |
|---|---|---|---|
| 7,937,387 B2 | 5/2011 | Frazier et al. | |
| 8,069,484 B2 | 11/2011 | McMillan et al. | |
| 8,566,476 B2 | 10/2013 | Shiffer et al. | |
| 8,713,681 B2 | 4/2014 | Silberman et al. | |
| 8,793,278 B2 | 7/2014 | Frazier et al. | |
| 8,881,271 B2 | 11/2014 | Butler, II | |
| 8,949,257 B2 | 2/2015 | Shiffer et al. | |
| 9,106,630 B2 | 8/2015 | Frazier et al. | |
| 9,268,936 B2 | 2/2016 | Butler | |
| 9,275,229 B2 | 3/2016 | LeMasters | |
| 9,413,781 B2 | 8/2016 | Cunningham et al. | |
| 2007/0169194 A1* | 7/2007 | Church | G06F 21/552 726/23 |
| 2008/0184367 A1 | 7/2008 | McMillan et al. | |
| 2009/0198651 A1 | 8/2009 | Shiffer et al. | |
| 2009/0198670 A1 | 8/2009 | Shiffer et al. | |
| 2009/0198689 A1 | 8/2009 | Frazier et al. | |
| 2009/0199274 A1 | 8/2009 | Frazier et al. | |
| 2010/0030996 A1 | 2/2010 | Butler, II | |
| 2011/0099635 A1 | 4/2011 | Silberman et al. | |
| 2011/0173213 A1 | 7/2011 | Frazier et al. | |
| 2012/0255003 A1* | 10/2012 | Sallam | G06F 21/554 726/23 |
| 2013/0247186 A1 | 9/2013 | LeMasters | |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |

(Continued)

*Primary Examiner* — Kambiz Zand
*Assistant Examiner* — Stephen Sanders
(74) *Attorney, Agent, or Firm* — Rutan & Tucker, LLP

(57) ABSTRACT

An analytics-based security monitoring system includes instructions that may be executed by a computing system to receive data in the form of event logs from one or more network devices transferred through a computing environment, detect a plurality of behavioral characteristics from the received event logs, identify behavioral fragments composed of related behavioral characteristics, and identify an attack by correlating the behavioral fragments against patterns of known malicious attacks. The analytics-based security monitoring system may then perform a learning process to enhance further detection of attacks and perform one or more remedial actions when an attack is identified.

25 Claims, 5 Drawing Sheets

(56) References Cited

U.S. PATENT DOCUMENTS

| | | |
|---|---|---|
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0344926 A1 | 11/2014 | Cunningham et al. |
| 2016/0044000 A1 | 2/2016 | Cunningham |

* cited by examiner

ANALYTICS-BASED SECURITY MONITORING SYSTEM AND METHOD

TECHNICAL FIELD

Aspects of the present disclosure relate to computing devices and, in particular, to an analytics-based cyber security monitoring system and method.

BACKGROUND OF THE INVENTION

The use of computing systems has increased to provide useful services for many facets of users' business and everyday life. Nevertheless, malicious users seem to continually attempt to gain access to other's computing systems for illicit (i.e., unauthorized) purposes, such as spying or other vandalous or nefarious activities. These malicious users launch attacks against computer systems, often exploiting weaknesses to gain entry. They have implemented numerous types of malicious software which may be collectively referred to as "malware." Malware generally refers to any software used to spy on a target computing system, or otherwise cause harm to the target computing system, such as intentional corruption of data stored on the computing system, theft of intellectual property, theft of credit card information, identity theft, bank fund transfer fraud, and the like. Examples of malware may include, for example, viruses, trojan horses, worms, and/or other programs intended to compromise computing systems as well as the data stored on these computing systems.

Many network devices within enterprises are monitored for purposes of security with a view to identifying indicators of compromise (IOCs) evidencing, verifying or tracking a malicious attack. The attack may be conducted by a human perpetrator such as a hacker or by malware. The resulting data can be presented to network or security administrators for their review, evaluation and, if appropriate, remedial action. Since this process can be challenging, various tools have been created to aid in finding "data of interest" within the presented logs.

It is known to use a Security Information and Event Manager (SIEM) to aggregate data related to security-related "events" (run-time behaviors) from multiple network devices. An SIEM can provide a holistic view of an organization's information technology (IT) security. Relevant data about IT security is typically produced in multiple locations (e.g., different network devices) and the SIEM aggregates the data to allow a single point of view to detect trends and patterns that may represent IOCs of IT security.

Known SIEMs may accomplish such aggregation by deploying multiple collection agents. These are installed in network devices (e.g., notebooks, servers, firewalls, routers, and/or intrusion protection systems) to gather the event data from their respective devices and store the event data in event logs maintained by the devices. Using the collection agents, the collected event data are supplied to a centralized management console, which stores them in a repository for purposes of analysis typically by trained security personnel, and provides reports for compliance assessment and remediation. The management console may also detect anomalies in the collected data, but to accomplish this, a highly trained SIEM administrator must typically first undertake the laborious task of developing a profile of the network devices and environment under normal operating conditions.

A drawback of such systems is that the volume of information being aggregated can be so large as to render extraction of actionable intelligence regarding IT security impractical. Also, SIEMs are typically expensive to deploy, complex to operate and manage, produce a high level of false positives and false negatives, and require highly trained personnel.

OVERVIEW OF THE DISCLOSURE

The present inventive concept remedies the aforementioned problems by providing, according to one aspect of the present disclosure, an analytics-based security monitoring system including instructions that may be executed by a computing system to receive event logs (data related to events or behaviors) transferred through a computing environment (e.g., network) from one or more network devices, detect a plurality of specific behavioral characteristics from the filtered data of the received event logs, correlate a first of the detected behavioral characteristics with at least one other detected behavioral characteristic using a correlation profile to identify one or more sets of related or mutually relevant behavioral characteristics, each set called a "behavioral fragment," and correlate the one or more behavioral fragments against known attack profiles to identify a malicious attack. After identifying a malicious attack, in some embodiments, the security monitoring system may perform a learning process to enhance the correlation profiles and attack profiles to improve detection of future attacks and, in still other embodiments, identify one or more remedial actions based on remediation profiles. Each remediation profile may identify successful (effective) remediation strategies for prior attacks.

The instructions may be further executed to apply a data selection, filtering and normalization mechanism as appropriate to reduce the size (quantity) of the received event logs to a manageable level and facilitate analysis. The normalization mechanism is adapted to normalize data associated with the received event logs into a common format prior to detecting the plurality of behavioral characteristics.

Depending on the embodiment, the analytics-based security monitoring system may use a number of factors in arriving at relevance of the behavioral characteristics to one another so as to form a behavioral fragment. These factors may include, for example: (i) whether the elapsed amount of time that has transpired between detection of the behavioral characteristics is under a threshold (for example, whether they occurred within a prescribed window of time), (ii) whether they were detected on the same or different network device(s), (iii) whether they arose during processing of the same object or type of object, and (iv) whether they arose while processing objects from the same network source (e.g., a particular internet server). These and other factors may be determined based on experiential knowledge derived from analysis of prior attacks. The correlated behavioral characteristics forming the behavioral fragment may relate to event logs obtained from a single network device or to event logs from plural network devices within a single computing environment, or even plural network devices located in different computing environments, depending on the deployment.

The instructions may be further executed to identify the attack by generating one or more scores associated with the behavioral characteristics, behavioral fragments, and/or potential/actual attacks. For example, a first, behavioral characteristic score may be indicative of (e.g., proportional to) whether one or more behaviors detected in the event log data constitutes a behavioral characteristic as indicated by behavioral correlation profiles; a second, behavioral fragment score may be indicative of (e.g., proportional to) the relevance of one detected behavioral characteristic to another detected behavioral characteristic as indicated by behavioral correlation profiles, and thus the confidence level that a set (one or more) of detected behavioral characteristics constitutes a behavioral fragment as indicated by the behavioral correlation profiles (where the profiles contain behavioral fragments developed through experiential knowledge of previously encountered benign events and/or previous detected attacks); and a third, attack score may be indicative of (e.g., proportional to) the likelihood that the determined behavioral fragments represent attack fragments and thus together indicate (evidence) an attack based on the attack profiles. Other embodiments may use only an attack score, or an attack score and one or more of the other two types of scores.

The instructions may be further executed to detect a plurality of behavioral characteristics within the behavioral data of the event logs using one or more detection weighting factors that are applied to each detected behavior in the event log data. The instructions may be further executed to correlate the one behavioral characteristic with the other behavioral characteristic(s) using correlation weighting factors or functions, one corresponding to each, which are reflected in the associated behavioral characteristic scores. The function may be a higher-order function, may include a heuristic process, and/or may utilize a schedule, profile, and/or probability distribution to assess the likelihood that the potential attack is valid/invalid. The correlation profile may include the correlation weighting factors, and these may be updated from time to time as experiential knowledge and the threat landscape evolves.

The instructions may be further executed to perform a learning process that includes analyzing a plurality previously identified attacks, and modifying the detection weighting factors according to the analyzed attacks. The instructions may be further executed to perform a learning process that includes analyzing previous detected attacks and modifying a similarity weighting factor of the correlation, comparison and attack profiles according to the analyzed attacks. The learning process may be conducted on event logs collected from network devices within a single computing environment, such as a private network of an enterprise or other organization. The instructions may be further executed to identify an inter-computing environment attack by comparing the correlated behavioral characteristics against an attack comparison profile including information associated with one or more other attacks identified in other computing environments, such as one or more other private networks.

The attack score may represent a likelihood that a potential attack is "valid" or "invalid". In this regard, a potential attack may be classified as "valid" where the attack score exceeds a prescribed threshold associated with a high probability or comfort level that the determined behavioral fragments (and therefore the observed and "clustered" set of behavioral characteristics) represent an attack, and "invalid" when the threshold is not exceeded. If valid, in some embodiments, the further instructions may automatically initiate a remedial action. The remedial action may include generating an alert message, tracing an origin of an object (e.g., a document, email, or webpage) across one or more computing nodes (e.g., network devices) associated with the attack, and/or halting operation of the one or more computing nodes associated with the attack.

The computing node may include a single network device (e.g., a laptop computing device, a tablet computer, a workstation, a personal computer, a mobile device, and/or a wireless communication device). The computing node and/or network device may include a complex computing structure with a computing cluster, a unified computing system, a fabric-based computing system, and/or a dynamic infrastructure. The instructions may be executed to perform the receiving of the event logs, the detecting of the plurality of behavioral characteristics, the determination of behavioral fragments, the identifying of the attack, and the performing of the one or more remedial actions, in this order.

The aforementioned may be achieved in another aspect of the present disclosure by providing an analytics-based security monitoring method. The method may include the step of receiving, using, e.g., an operations management application with instructions stored on a non-transitory medium and executed on at least one processor, event logs collected from at least one computing node in a computing environment. The method may further include the step of detecting, using the instructions, a plurality of behavioral characteristics in data from the received event logs. The method may further include the step of correlating a first detected behavioral characteristic with at least one other behavioral characteristic using a correlation profile to identify one or more sets of related or mutually relevant behavioral characteristics based on a correlation profile of known, frequently related behavioral characteristics, and correlate or compare the one or more resulting behavioral fragments against a malicious pattern associated with known attacks to determine whether a malicious attack has occurred. The method may further include the step of performing, using the instructions, one or more remedial actions when the attack is identified.

The aforementioned may be achieved in another aspect of the present disclosure by providing a security monitoring system having a security monitoring framework stored in at least one memory and executed on at least one processor of a computing system. The security monitoring framework may include a behavioral characteristic detection module configured to detect a plurality of behavioral characteristics in data from event logs collected from at least one network device (e.g., computing node) in a computing environment. Each of the plurality of behavioral characteristics may represent an action conducted in the computing environment (or a network device therein) that is associated with expected or unexpected use of the computing environment (or the network device). The security monitoring framework may include a behavioral characteristic correlation module configured to identify one or more sets of related or mutually relevant behavioral characteristics forming a behavioral fragment based on a correlation profile of known, frequently related behavioral characteristics by correlating a first detected behavioral characteristic with at least one other behavioral characteristic using the correlation profile. The security monitoring framework may include an attack identification module configured to determine the occurrence of an attack by correlating at least one or more behavioral fragments each formed from a set (one or more) of the behavioral characteristics against an attack correlation profile having a plurality of malicious patterns each including information associated with a set of behavioral fragments of known attacks. The security monitoring framework may include a remedial action generation module configured to perform one or more remedial actions when the attack is identified.

In some embodiments, the behavioral characteristic detection module is configured with a plurality of detector modules, together forming a distributed real-time computation system, where each detection module can be configured as a software plugin dedicated to detecting a specific type of behavior, or behavior of a specific type of network device, or both. The detection modules can be easily updated or replaced as new or different types of malicious behaviors are employed by malicious actors or malware and the threat landscape evolves.

The behavioral characteristic detection module may also include a score generator which associates a score with each behavioral characteristic identified in the received event log data, and can be used to influence scores generated for the individual behavioral fragments by the behavioral characteristic correlation module and/or scores generated for the combination of behavioral fragments constituting actual or potential attacks by the attack identification module in embodiments in which each of these modules generates the noted scores (as by accessing scores associated with the behavioral characteristics, fragments or potential/actual attacks stored in the profiles). The behavioral characteristic and fragment scores may reflect key distinguishers in the associated behavioral characteristics and fragments (respectively) related to known malicious attacks and/or benign activities.

It will be seen that this approach may be used to further reduce the size (quantity) of the event log data requiring analysis at each stage of analysis. Received event log data associated with a behavioral characteristic score above a prescribed threshold may be passed to the behavioral correlation module and received event log data associated with scores below the threshold may be disregarded (as may be any event log data not relevant to a behavioral characteristic). Similarly, event log data associated with a behavioral fragment score above a prescribed threshold may be passed to the attack correlation module and received event log data associated with behavioral fragment scores below the threshold may be disregarded (as may be any behavioral characteristics not forming a behavioral fragment). Finally, event log data associated with an attack pattern score above a prescribed threshold may be used to identify an attack, and received event log data associated with an attack pattern score below the threshold may be disregarded as not being part of (or indicative of) an attack. In alternative embodiments, event log data may be stored (cached) in a behavior store for future analysis for a prescribed time or up to a prescribed quantity regardless of the scores or if the scores are above any of the thresholds noted above or above a second set of thresholds that may be lower than the thresholds noted above.

In some embodiments, the behavior correlation module may determine that the behavioral characteristics appear to exhibit a high correlation with respect to a specific behavior pattern but may be missing one or more behavioral characteristics identified in the pattern. In this case, the behavior correlation module may provide a first control signal over a feedback line or other communication link (established, for example, by hardware, wireless, shared memory or otherwise) to the behavioral characteristic detection module to identify the missing characteristic(s) in the received behavior data as stored in a behavior store (e.g., cache). If found using this recursive approach, the behavioral characteristic detection module may provide the associated data to the behavior correlation module, which adds the additional characteristic to the behavioral fragment. In embodiments using scores to represent the correlation, the score associated with the augmented behavioral fragment may be increased to reflect its more complete behavioral characteristics and its match or closer correlation (than previously determined) to the pattern in the correlation profile. Analogously, the attack identification module may seek additional behavioral fragments not previously detected by providing a second feedback control signal to the behavioral correlation module (also called the "fragment determination module") in light of known attacks described in the attack profile so as to increase the attack score if found within the detected behavioral characteristics (but not previously associated with the other behavioral characteristics composing the fragment). Indeed, the second feedback control signal may trigger a first feedback signal so as to seek new behavioral characteristics in the event log data, as described above.

In some embodiments, the results from the behavior correlation module or the attack identification module, including, for example, the associated behavioral fragment score and the associated attack score, may be provided to an inter-computing environment stage for further analysis. Accordingly, the invention can be implemented as including a first, local computing environment analysis stage and a second, inter-computing environment analysis stage. These stages can be co-located on a single system or may be mutually remote from one another and configured for communication via a communication link (e.g., dedicated line or other communication link, such as a network over which cloud service may be provided). For example, the local computing environment analysis stage may be implemented using a compute facility (having its own processing system and memory) that is different from the compute facility (including processing system and memory) implementing the inter-computing environment analysis stage. Alternatively, they may share the same compute facility. For convenience of description herein, the inter-computing environment analysis stage performs analysis across at least two computing environments or compares results from the local computing environment with results from one or more other computing environments.

In some embodiments, the inter-computing analysis stage includes an inter-computing environment comparison module with a score generator, and an inter-computing environment attack identification module. The inter-computing environment comparison module receives the results from a plurality of local computing environment analysis stages to compare or correlate, depending on the embodiment, detected behavioral fragments or detected attack patterns of identified attacks across those environments (e.g., across proprietary networks). Where an attack scenario has been observed in a first of the computing environments, its detected behavioral fragments may be compared or correlated with behavioral fragments detected in a second of the computing environments. In this way, attacks that may have been launched against different computing environments (e.g., networks, organizations, locals) may be more reliably identified and intelligence regarding the attacks may be aggregated to provide a holistic view that may aid in remediation or other action. Where detected behavioral fragments of a suspicious nature (e.g., a high attack score though not over a prescribed threshold) in a first of the computing environments, a high correlation with detected behavioral fragments constituting an attack in a second of the computing environments may be used to reexamine a set of the detected behavioral characteristics in the first computing environment and potentially result in the identification of an attack where none was found before. In some embodiments, the correlation of results from one or more other computing environments may trigger a third feedback control signal to seek additional behavioral characteristics or fragments in the first, local computing environment, which may yield higher attack scores, identify attacks not previously detected locally and provide additional threat intelligence. This approach may prove useful in identifying multi-phase attacks (e.g., botnets) involving multiple computing environments or APTs launched against multiple targets in various computer environments.

Additional aspects, advantages, and utilities of the present disclosure will be set forth in part in the description which follows and, in part, will be obvious from the description, or may be learned by practice of the present disclosure.

The foregoing is intended to be illustrative and is not meant in a limiting sense. Many features and subcombinations of the present disclosure may be made and will be readily evident upon a study of the following specification and accompanying drawings comprising a part thereof. These features and subcombinations may be employed without reference to other features and subcombinations. The scope of the invention, however, shall be defined by the appended claims.

BRIEF DESCRIPTION OF THE DRAWINGS

Embodiments of the present disclosure are illustrated by way of example in which like reference numerals indicate similar elements and in which.

Figure 1:
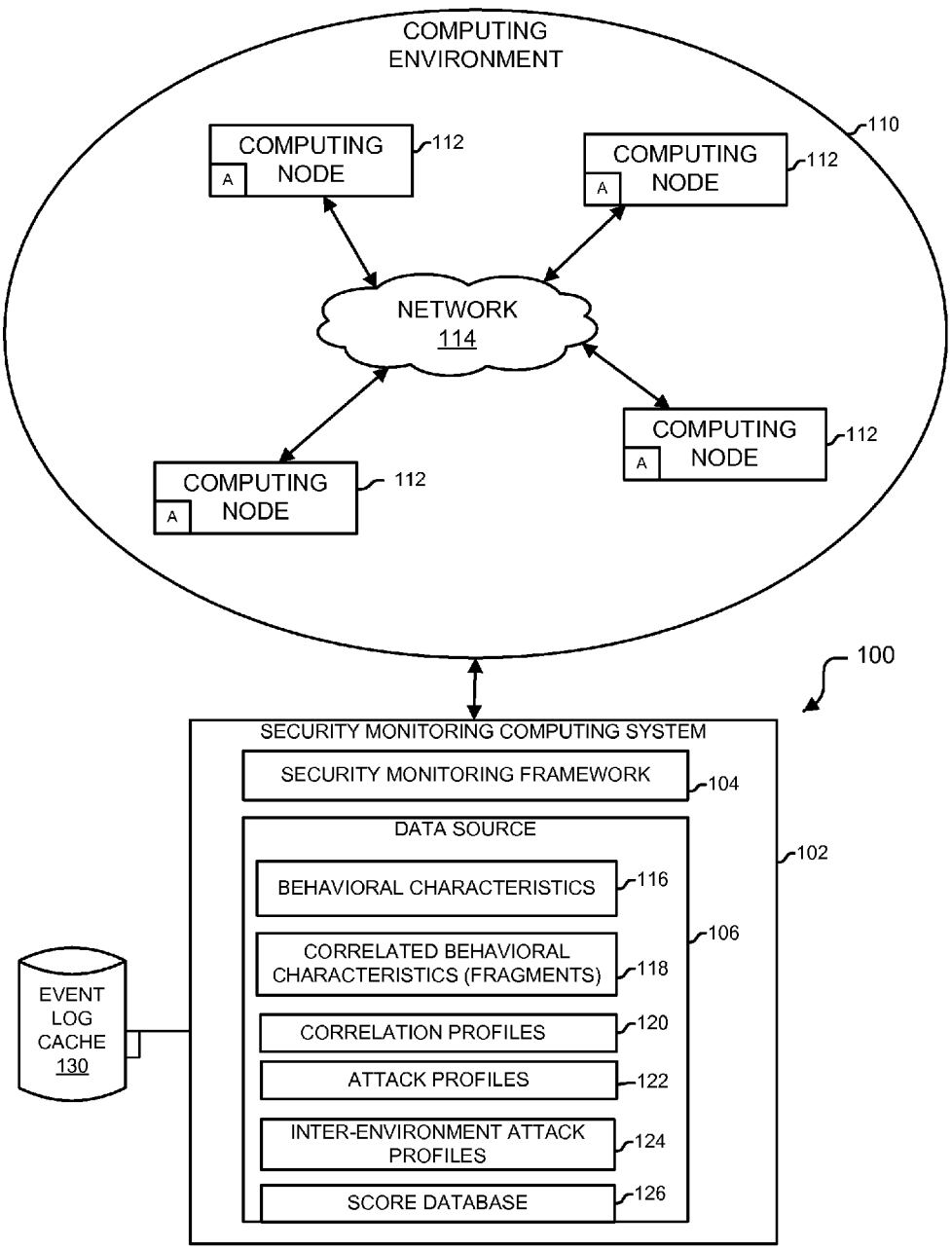
FIG. 1 illustrates an example analytics-based security monitoring system according to one embodiment of the present disclosure.

The drawing figures do not limit the present disclosure to the specific embodiments disclosed and described herein. The drawings are not necessarily to scale, emphasis instead being placed on clearly illustrating principles of certain embodiments of the present disclosure.

DETAILED DESCRIPTION OF THE INVENTION

The following detailed description references the accompanying drawings that illustrate various embodiments of the present disclosure. The illustrations and description are intended to describe aspects and embodiments of the present disclosure in sufficient detail to enable those skilled in the art to practice the present disclosure. Other components can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

I. Terminology

In the following detailed description, terminology is used to describe features of the present disclosure. For example, references to terms "one embodiment," "an embodiment," or "embodiments" mean that the feature or features being referred to are included in at least one aspect of the present disclosure. Separate references to terms "one embodiment," "an embodiment," or "embodiments" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present disclosure may include a variety of combinations and/or integrations of the embodiments described herein. Additionally, all aspects of the present disclosure as described herein are not essential for its practice.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As the present disclosure is susceptible to embodiments of many different forms, it is intended that the present disclosure be considered as an example of the principles of the present disclosure and not intended to limit the present disclosure to the specific embodiments shown and described.

II. General Architecture

Embodiments of the present disclosure provide an analytics-based security monitoring system for the detection of attacks, as perpetrated by malware (e.g., viruses, Trojan horses, spyware, adware, worms, and the like) and malicious adversarial activity conducted by human actors directly (e.g., advanced persistent threat (APT) actors, hackers, and the like). The system may run as a background process to continually obtain data regarding behaviors during processing on one or more network devices. The information may be supplied to the system by network devices over a network, where the network devices are equipped with facilities (conventional collection agents, for example) to passively monitor and store the data in event logs and provide the event logs to the system. In this regard, an event log should be construed broadly to encompass a record, file, database or other collection, in which data related to an event may be stored, e.g., in memory or a storage device.

FIG. 1 illustrates an example analytics-based security monitoring system 100 according to one embodiment of the present disclosure. The system 100 addresses the problems discussed above with conventional security monitoring systems among other benefits and solutions. The system 100 includes a security monitoring computing system 102 having a security monitoring framework 104 and a data source 106. The security monitoring framework 104 communicates with a computing environment 110 to detect behavioral characteristics in the data of event logs conveyed through the computing environment 110, identifies behavioral fragments by correlating multiple behavioral characteristics using a correlation profile 120 to determine behavioral fragments, again based on the correlation profiles, and then, using the behavioral fragments, identifies an attack based on previously detected attack profiles.

The term "event log" (e.g., a log file) generally refers to data with respect to dynamic (e.g., run-time) behaviors that are gathered by one or more computer nodes 112, e.g., end points, intermediate nodes or other network devices coupled with network 114 in the computing environment 110. The data of event logs may be collected using one or more collection agents deployed by the system 100 and installed in the computer nodes 112. The agents are designated by the letter-"A" in the figures. In some embodiments, the event logs may store data collected by collection agent functionality embedded within or constituting applications running within the computer nodes 112. The event logs may contain data generated by anti-virus applications on the computer nodes 112. The event logs may contain alerts and related data generated by intrusion protection systems, intrusion detection systems and/or malware detection systems running in the computing environment 110. Each such system is encompassed by the terms "computer node" and "network device". Each of the event logs contains data from (and, often, about) at least one of the computer nodes 112 in the computing environment 110, such as run-time activities, network activity, or other behavior.

In this description, the term "behavior" generally refers to any low level activity in the computing environment 110, which may be captured as an event during processing within or in communications from a network device. "Behavioral characteristic" generally refers to any activity in the computing environment 110 that may be categorized according to a specified criteria associated with expected or unexpected use of the computing environment 110. Expected use of the computing environment 110 generally includes certain actions that follow a prescribed regimen that may be associated with normal behavior, while unexpected use exceeds these bounds. For example, a behavior may be a request to open a communication port in a network device. Examples of behavioral characteristics may include certain criteria, such as a callback (e.g., outbound communication or communication attempts, sometimes referred to as beaconing) initiated by a segment of code and directed to a potential target computing node, the quantity and/or type of authentication (e.g., user login) attempts, data transmission techniques, network searching techniques, and the like. The behavioral characteristics can be determined by analyzing the behaviors contained within the event logs.

Each behavioral characteristic may represent an action conducted in the computing environment having a plurality of network devices, such as within a proprietary or private network of an enterprise or other organization, which action is associated with expected or unexpected use of the computing environment 110. The event data may be collected and stored in event logs by a background process running "behind the scenes" on each of the one or more computer nodes 112 or by a foregoing process on one or more of the computing nodes 112 (e.g., a device that sniffs or otherwise monitors network traffic). The background process may run without interfering with routine, "foreground" operations and, in some embodiments, without being apparent to the end users or requiring end user interaction during operation. In some embodiments, the background process may be deployed to run during a forensic investigation of a previously detected attack, and in other embodiments the background process may be deployed to run during normal run-time to continuously monitor runtime behavior for an attack.

The criteria used to delineate what is considered normal behavioral characteristics as opposed to what is considered abnormal behavioral characteristics that may provide evidence or an indication of an attack. For example, multiple authentication attempts generated by the computing node 112 at a rate of less than a specified number of attempts per hour may be an indication of normal behavior, while any rate above that may be an indication of abnormal behavior. As another example, a spidering technique (e.g., blind searches or even mere communication for content on each of multiple computing nodes) during a first specified time of day (e.g., during business hours) may be considered normal behavior, while another spidering technique conducted during late night hours may be considered to be abnormal behavior. Other example criteria that may be used to generate a behavioral characteristic include lateral communication (e.g., ongoing communication between computing nodes (e.g., hosts) and/or node groupings in the computing environment 110), and a relatively high quantity of failed/successful authentication attempts.

Behavioral characteristics may be determined to be abnormal according to a context in which they are performed. For example, movement and/or manipulation of large quantities of document files may be considered normal behavior when performed by computing nodes 112 operated by document management personnel, while being considered to be abnormal when performed by computing nodes 112 operated by other personnel who do not normally manage large quantities of documents. In cases such as these, whether the movement and/or manipulation of large quantities of document files is determined to constitute normal or abnormal behavior may be context specific based upon the nature and intended use of each the computing node 112 (e.g., the type of personnel who operates the computing nodes 112).

Each behavioral characteristic by itself may provide a relatively low confidence level that an attack exists, but a structured combination of multiple behavioral characteristics associated with one or a group of computing nodes 112 in the computing environment 110 may be evidence of an attack. For example, an abnormally high rate of authentication attempts may be caused by many factors, such as a malfunctioning keyboard, a legitimate user who has forgotten his or her password, or other feature of the computing node 112 that is exhibiting a failure condition. However, if the computing node 112 that generated the high rate of authentication attempts also exhibits another behavioral characteristic in which it performs an abnormally high movement rate of data (e.g., data exfiltration, transport, and/or staging), these behavioral characteristics may be correlated with one another (as mutually relevant) in identifying an attack that may exist with respect to that computing node 112. Such combinations of behavioral characteristics are referred to as a behavioral fragment.

Embodiments of the present disclosure provide an analytics-based security monitoring system that monitors activity as stored in the event logs generated on the computing environment 110 to identify attacks by detecting behavioral characteristics and correlating the behavioral characteristics with a pattern of behavioral characteristics of a correlation profile, thereby forming behavioral fragments from those characteristics, and correlating the behavioral fragments with patterns of behavioral fragments of known malicious attacks contained in an attack profile in order to identify a malicious attack in the computing environment. This approach provides flexibility to adapt to evolving threat behaviors as well as providing a filtering mechanism at each stage of analysis to reduce the size of data into a manageable size for further analysis. Additionally, the system 100 may also provide a learning (e.g., adaptive) technique that continually updates how the behavioral characteristics and fragments are determined and/or how the behavioral fragments may be correlated with known patterns of malicious or benign behaviors of the correlation profiles to identify the attack. As an additional feature, the system 100 may implement a similarity detection technique on an inter-computing environment basis to further enhance the detection accuracy as will be described in detail below.

Embodiments of the present disclosure may further enhance detection of attacks by identifying attacks on a behavioral basis using intent-driven metrics to capture the purpose behind the attack behavior, which may be independent of any specific signature-based detection scheme. Using this behavioral approach to attack detection, it may be relatively more difficult for attackers to avoid detection, and may also drive up costs for the attackers by forcing them to change their tools, techniques, and procedures (TTPs) to circumvent the security features provided by embodiments of the present disclosure.

In general, the system 100 employs behavioral correlation profiles 122 and attack profiles 122 that may be used to identify any context-based behavioral characteristics that may be associated with an attack. These correlation profiles 122 and attack profiles 122 may be generated based upon experiential knowledge, such as that obtained from previous malicious attacks and distributed e.g., over a network from a central location (e.g., cloud based facility) to the system 100 for use in detecting future attacks. Thereafter, the system 100 may perform a feedback process to continually adjust (e.g., tune) the correlation profiles 122 and attack profiles 122 (e.g., using a learning module 222 (FIG. 2)) for enhancing the detectability of behavioral characteristics, fragments and attacks, based on prior attack information. Moreover, the system 100 may provide these "adjustments" to and receive updates from an updater 219, e.g., at the central location.

The computing environment 110 monitored by the system 100 may include any type and number of computing nodes 112. For example, the computing environment 110 may include a single computing device (e.g., a laptop or notebook computer, tablet computer, personal computer, workstation, a mobile device such as a wireless communication device, and the like), and/or a complex computing structure, such as one including multiple computing devices (e.g., a cluster, a unified computing system, a fabric-based computing system, a dynamic infrastructure, and the like). In one embodiment, the computing environment may be the computing system 102 that executes the security monitoring framework 104 and includes a data source 106, such as a data repository stored in memory.

As shown, the computing environment 110 includes multiple individual computing nodes 112 that communicate among one another using the network 114. Each computing node 112 may include, for example, a workstation, a notebook computer, a personal digital assistant (PDA), and/or complex computing structure, such as described above. The computing nodes 112 may also include other communication devices, such as switches, routers, firewall appliances, or other communication devices that facilitate communication among the other computing nodes 112. Each computing node 112 includes at least one processor for executing instructions stored in a memory to perform the features of the present disclosure described herein.

The data source 106 stores behavioral characteristics 116, correlated behavioral characteristics (fragments) 118, behavioral correlation profiles 120, information profiles regarding previously identified attacks 122 (called "attack profiles"), and information profiles regarding inter-computing environment-based attacks 124 (called "ICE attack profiles). The behavioral correlation profiles 120 contain information to map (associate) event data from the event logs into behavioral characteristics 116, which may be viewed as mapping lower order activities from the event logs into higher order behaviors. The correlation profiles 120 may also contain information to map (e.g., associate and cluster) behavioral characteristics into behavioral fragments 118, which can be viewed as a set or cluster of related (mutually relevant) behavioral characteristics. Some embodiments may provide alternatively for separate correlation profiles for the behavioral characteristics and fragments, e.g., in separate stores.

The attack profiles 122 may identify attacks using the behavioral fragments 118 and previously identified attacks 118, as will be described in detail hereinbelow. The ICE profiles 124 may be used in tandem with the attack profiles to enhance identification of attacks that occurred in plural computing environments, including the computing environment 110 and one or more other computer environments (not separately shown). Sometimes these inter-computing environment attacks have behavioral characteristics and/or fragments that are sufficiently the same (similar, e.g., with slight variations) to constitute the same or similar attack (e.g., a polymorphic malware attack) occurring in each environment or a family of related or similar attacks occurring in plural environments. At other times, these attacks can be inter-computing environment attacks characterized as having some behavioral characteristics or fragments taking place (monitored) in each of plural computing environments, though related to one another and having an overarching malicious objective.

Use of these profiles is described herein for the most part in terms of correlation, which is a known concept for measuring similarity or sameness of two elements (e.g., characteristics, fragments, or attacks). If the correlation results in a score exceeding a prescribed threshold (e.g., statically or dynamically set), the elements being correlated are regarded as similar or the same, depending on the value of a correlation score, e.g., a numerical value. The resulting score may be stored in a score store (such as database 126) in association with the behavioral characteristics 116, behavioral fragments 118, and/or attack information 122. In some embodiments, the invention can be practiced using a comparison profile to provide a match or non-match between two elements indicative of sameness (equality) or non-sameness (inequality) without regard to similarity. Comparison can be regarded as a reductive case of correlation. Although the data source 106 is shown as part of the security monitoring computing system 102, other embodiments contemplate that the data source 106 may be included on any suitable auxiliary computing device or storage device, such as one or more of the computing nodes 112 of the computing environment 110.

The communication network 114 may include any suitable type, such as the Internet, an intranet, or another wired and/or wireless communication network. The network 114 may provide communication among the computing nodes 112 using any suitable protocol or messaging scheme. For example, the computing nodes 112 may communicate using a transfer control protocol (TCP), JavaScript Object Notation (JSON) formatted text, user datagram protocol (UDP), overlay networks, and the like. Additionally, the computing nodes 112 may communicate using any and/or all layers of the Open Systems Interconnection (OSI) stack. Other examples of communication protocols exist.

The security monitoring framework 104 communicates with the communication network 114 to receive data (e.g., within network traffic) to be analyzed for the presence of attacks. In one embodiment, the security monitoring framework 104 receives communication data from one or more routers and/or switches (not shown) configured in the computing environment 110 in which the routers and/or switches function as sniffers to passively monitor/observe data, and transmit event logs (e.g., events, log files, and/or other forms of data) to the security monitoring framework 104. In this regard, the routers and switches can be regarded as computing nodes and network devices. In some cases, the security monitoring framework 104 may operate in a streaming mode to obtain certain forms of ongoing events in the computing environment 110 in a real-time fashion, or in a batch mode where stored event logs are obtained as block data directly from the computing environment 110 or indirectly via a storage device (not shown) that records event logs from the computing environment 110 for later analysis. The routers and/or switches may transmit all data transmitted through the network or only a select portion of all data transmitted through the network. In other embodiments, the security monitoring framework 104 additionally or instead receives communication data from one or more other network devices including endpoints in the computing environment 110, where the communication data includes event logs generated during processing by the individual network devices.

Figure 2:
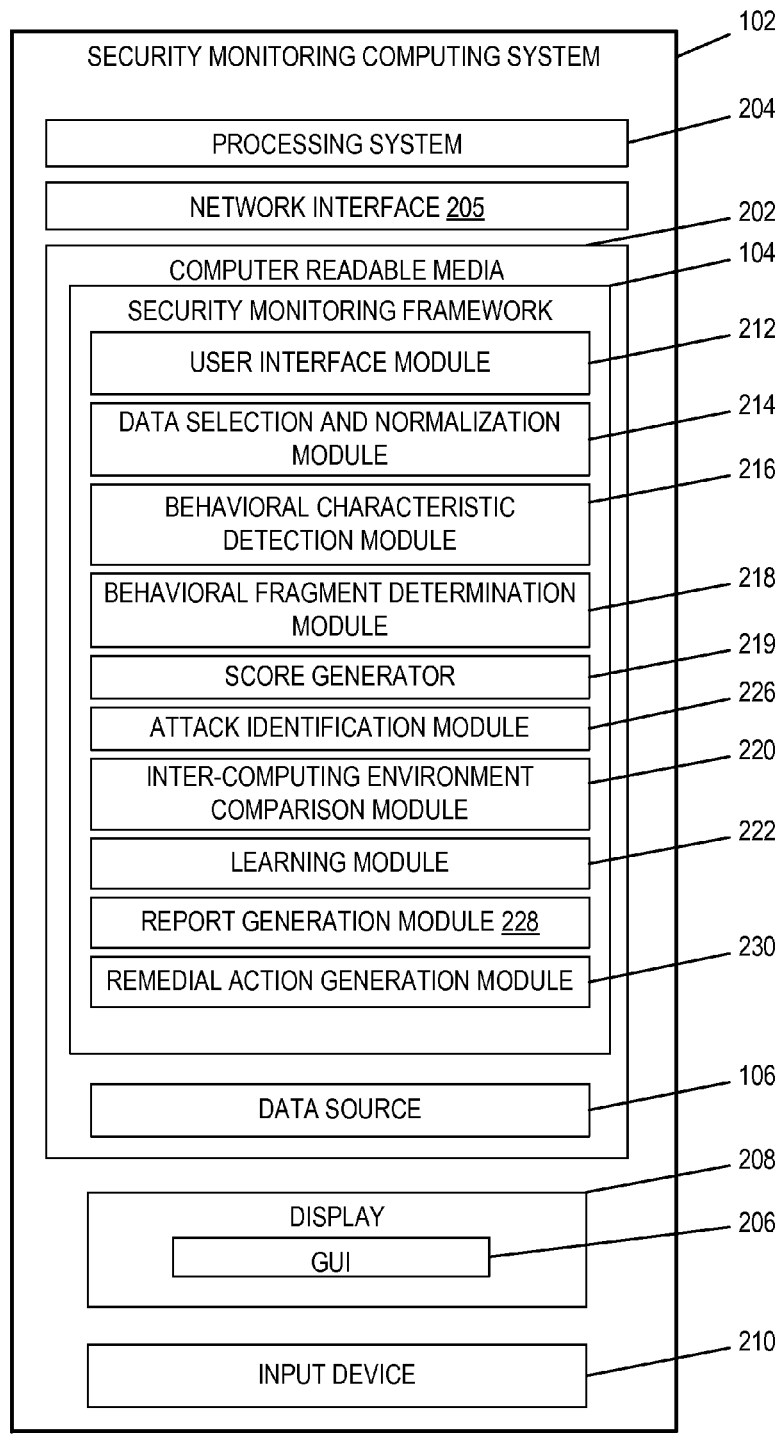
FIG. 2 illustrates a block diagram depicting an example security monitoring framework executed on the security monitoring computing system according to one embodiment of the present disclosure.

FIG. 2 illustrates an example security monitoring computing system 102 on which the security monitoring framework 104 may be executed according to one embodiment of the present disclosure. Although the example security monitoring computing system 102 as shown is implemented as instructions stored in a computer readable medium 202 and executed on a processing system 204, it is contemplated that embodiments of the security monitoring computing system 102 may be implemented as hardware, executable software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), nonvolatile storage, logic, or some other physical hardware component or module.

The security monitoring framework 104 is stored in a computer readable media 202 (e.g., memory) and is executed on a processing system 204 of the security monitoring computing system 102. The computer readable medium 202 includes volatile media, nonvolatile media, removable media, non-removable media, and/or another available medium. By way of example and not limitation, non-transitory computer readable medium 202 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the security monitoring computing system 102 also includes a graphical user interface (GUI) 206 displayed on the display 208, such as a computer monitor, for displaying data. The security monitoring computing system 102 also includes an input device 210, such as a keyboard or a pointing device (e.g., a mouse, trackball, pen, or touch screen) or any type of human interface device (HID) to enter data into or interact with the GUI 206. According to one aspect, the security monitoring framework 104 includes several modules that are executable by the processing system 204 as will be described in detail herein below.

A user interface module 212 facilitates the receipt of input data and/or output data from or to a user (e.g., an administrator of the system 100), respectively. For example, the user interface module 212 may generate the GUI 206 to the display 208 in which the GUI displays information associated with operation of the security monitoring framework 104 and may also provide one or more fields for receiving information from the user for configuring operation of the security monitoring framework 104, processing requests to obtain information from the security monitoring framework 104, and/or displaying alert messages indicating the identification of one or more attacks.

A data normalization module 214 receives communication data from the computing environment 110 and converts the data into a standardized format to be processed by other modules in the security monitoring framework 104 if not already in a suitable format. In general, the data normalization module 214 obtains data in disparate formats, which may often be device specific or vendor specific, and transforms the data into a readily consumable, common format. For example, the data normalization module 214 may transform data associated with a first authentication protocol to that of a second authentication protocol such that any ensuing analysis and correlation may be provided using a common (e.g., the second) authentication protocol. The data normalization module 214 may also be configured to obtain the data from disparate sources, such as from routers that provide the data in packetized form (e.g., TCP/IP packets), text documents, and/or audio/video generation devices, such as microphones and/or video cameras.

A behavioral characteristic detection module 216 detects behavioral characteristics 116 from the normalized data processed by data normalization module 212. In general, the behavioral characteristic detection module 216 may identify one or more behavioral characteristics that when taken alone, may appear benign, but when taken with one or more other behavioral characteristics, may be indicative of an attack. The behavioral characteristics 116 may be associated with any criteria that may be used to form the basis of an attack. Examples of such behavioral characteristics include the quantity and/or type of authentication attempts, abnormal data transmission behaviors, abnormal network searching techniques, and the like. In one embodiment, the behavioral characteristic detection module 216 assigns a weighting value to each detected behavioral characteristic according to one or more factors, such as a confidence level of the detected behavioral characteristic, a severity level of the detected behavioral characteristic, and/or a suspiciousness level of the computing node 112 from which the behavioral characteristic originated.

In a particular example, the behavioral characteristic detection module 216 may be configured to detect certain types of authentication attempt behaviors, such as a rapid authentication attempt behavioral characteristic where an external entity attempts to authenticate to a computing node 112 or a process running within the computing node 112 using differing passcodes on a regular periodic basis. In this case, the behavioral characteristic detection module 216 may include several criteria that may be applied to the received data to determine whether a rapid authentication attempt behavioral characteristic exists. Examples of such criteria may include a frequency of how often the authentication attempts are made, such as a windowing mechanism including upper and lower elapsed time limits (e.g., 0.05 seconds to 1.0 seconds), the source of the authentication attempts (e.g., internal or external to the computing environment 110), the target process and/or the computing node 112, the type of passcodes delivered to the target process and/or the computing node 112 (e.g., sequentially ascending/descending passcodes, random, etc.), and the like. If the behavioral characteristic detection module 216 determines that a particular element of behavioral data or sequence of multiple behavioral data elements from the received event log meets each of these criteria, it may generate a behavioral characteristic for further analysis by the system 100. Criteria relevant to other types of behavioral characteristics may be applied by the behavioral characteristic detection module 216 for detection of other types of behavioral characteristics.

A behavioral characteristic correlation module 218 correlates multiple behavioral characteristics 116 with one another using at least one of multiple correlation profiles 122 stored in the data source 106. The behavioral characteristic correlation module 218 may use one or more functions, such as a higher order function, a heuristic function, a schedule, a profile, and/or a probability distribution function, either singularly or in combination to determine correlations among multiple behavioral characteristics. Each correlation profile 120 generally includes information associated with a set of behavioral characteristics that form a behavior pattern. When associated behavioral characteristics in the normalized data are observed (e.g., detected) with a relatively high degree of relevance to each other as indicated by the behavioral characteristic pattern, they may provide evidence of an attack or at least a portion of an attack. The behavioral pattern of each correlation profile 120 may include any combination of behavioral characteristics that may be related to one another, such as those behavioral characteristics that occur during or close to the same time frame, behavioral characteristics that originate from the same computing node, behavioral characteristics that originate from multiple computing nodes that are owned by the same user or accessed using the same user credentials, behavioral characteristics that access or manipulate the same element of data, and the like.

An attack identification module 219 receives the determined behavioral fragments from the behavioral fragment detection module 218 and correlates those fragments with a plurality of attack patterns of known attacks previously detected and analyzed, as stored in the attack profiles repository 122. The attack identification module 219 may use, depending on the embodiment, one or more functions, such as a higher order function, a heuristic function, a schedule, a profile, blacklists, whitelists, and/or a probability distribution function, either singularly or in combination in identifying and verifying an attack.

One example of a particular attack profile may be associated with a multi-phase attack that includes an initial phase in which a small package of code is delivered in what may appear to be a benign payload of network packets to a computing node. Once the small package of code is stored on a computing node, it may enable the delivery of a larger segment of code including an actual exploit code to that computing node. Individual behavioral fragments identified in such a multi-phase attack may include (i) initial receipt of the small package of code to the computing node 112 (e.g., a first behavioral fragment), (ii) a callback operation that is performed at the computing node 112 that is performed by the small package of code to a malicious server (e.g., a second behavioral characteristic) (a second behavioral fragment), and (iii) receipt of the larger malicious package from the malicious server (e.g., a third behavioral fragment). In this case, the attack profile associated with the multi-phase attack pattern may include information with respect to each of these behavioral fragments such that, when all of these fragments are detected by the attack identification module 226, an attack may be identified.

In various embodiments, the security monitoring computing system 102 employs scoring techniques with respect to the behavioral characteristics, behavioral fragments, and identified attacks. In one such embodiment, the behavioral characteristic correlation module 218 may generate a score (e.g., a fragment score) for each correlated group of behavioral characteristics forming a fragment that represents the degree of relatedness of the behavioral characteristics to one another, and the attack identification module 219 may generate another score (e.g., an attack score) that represents a likelihood that the behavioral fragment or fragments are attack fragments and indicative of an attack. The attack score in such embodiments may reflect the fragment score(s) and the correlation of determined fragments with attack profiles of past attacks. In other embodiments, only an attack score is employed, which may reflect only correlation of determined fragments with attack profiles of past attacks. For example, a relatively high attack score represents a higher likelihood of an attack, while a relatively low attack score represents a lower likelihood of an attack.

In one embodiment, a further score may be employed, a behavioral characteristic score indicative of (e.g., proportional to) whether one or more behaviors detected in the event log data constitutes a behavioral characteristic as indicated by behavioral correlation profile. Each behavior detected in the event log data may be associated with one or more weighting factors that represent a confidence level regarding the relevance of that behavior to the attack analysis since the correlation profile may designate certain event data and certain detected behaviors as benign. Such benign event data and detected behaviors can be ignored and not further analyzed.

In one embodiment, each behavioral characteristic may be associated with one or more weighting factors that represent a confidence level regarding the relevance of that characteristic to other detected behavioral characteristics within a behavioral fragment. That is, a behavioral characteristic having a relatively high weighting factor may have a relatively higher degree of relevance to others within a behavioral fragment as represented by the correlation profile, than another behavioral characteristic having a relatively lower weighting factor. Additionally, each behavioral characteristic may include multiple weighting factors that are associated with multiple aspects of one or more behavioral fragments. Moreover, each behavioral fragment may be associated with one or more weighting factors that may represent a confidence level regarding the relevance of that fragment to other detected behavioral fragment, in a manner just described for behavioral characteristics. An attack score may be generated based on weighting factors of the behavioral fragments and based on the attack profiles so as to indicate the likelihood that the detected behavioral fragments constitute attack fragments of an attack.

For example, the callback operation behavioral characteristic as described above may include a first weighting factor associated with the source computing node 112 from which it was generated, a second weighting factor associated with an elapsed amount of time that has transpired from when the first behavioral fragment (e.g., initial receipt of the segment of code) was detected, and a third weighting factor associated with whether the third behavioral fragment (e.g., receipt of larger segment of code) has been delivered to the same computing node 112 or a different computing node. The attack identification module 219 may combine the weighting factors of the behavioral fragments pursuant to the correlation profile to generate the attack score indicating a likelihood that the set of determined behavioral fragments is indicative of an attack.

Embodiments of the behavioral characteristic detection module 216, the behavioral fragment determination module 218 and the attack identification module 226 may anticipate variations in attacks by identifying similarity in behavioral characteristics or behavioral fragments to an existing correlation profile or attack profile. That is, use of correlation profiles may provide for identification of attacks using behavioral characteristics and fragments as defined by those profiles as well as identification of attacks using variations of behavioral characteristics and fragments defined by those profiles. For example, the attack identification module 226, using an existing multi-phase attack profile as described above may detect other types of multi-phase attacks, such as those that may use a certain portion of behavioral fragments or variations in such behavioral fragments, as defined in the multi-phase attack profile. For example, the attack identification module 226 may use an existing multi-phase attack profile to identify a particular attack, such as one in which the small segment of code (e.g., first behavioral characteristic) communicates with another differing computing node 112 to generate the callback operation. In this manner, the system may identify attacks that may have been modified to otherwise circumvent the detection capabilities provided by the system 100 according to certain embodiments of the present disclosure.

In another example, one of the detection modules 306 may be equipped to detect unusual port activity at a network device in the computing environment 110 as indicated by the received event log data. This module can be referred to as an "unusual port activity detection module". This detection module 306 may provide the noted activity to the behavioral correlation module 216. In some embodiments, the detection module 306 may generate a score for the activity and pass the behavioral characteristic and the associated score to the correlation module. In this case, the detection module 306 may associate a high score with the observed unusual port activity, based on a behavioral correlation pattern specifying typical ports used by the network device or groups of network devices (entities) in the computing environment 110 (e.g., the ports authorized for use by an applicable communication standard) and identifies such unusual port activity as a detected behavioral characteristic when the activity differs from expectation. Meanwhile, another detection module 306, called the "unusual beaconing detection module," receives data from the same event log and identifies the same network device as exhibiting repeating network communication patterns that are unexpected when compared with those expected pursuant to the behavioral correlation profile, and thus identifies this activity as another behavioral characteristic.

In this case, the behavioral correlation module 218 receiving these two behavioral characteristics may correlate the unusual port activity and the unusual beaconing activity into a behavioral fragment based on their "relatedness" as indicated by a behavioral correlation profile. The behavioral correlation module 218, which may have sufficient evidence to associate the unusual port activity with a score of 0.80 (e.g., reflecting an assessment of a combination of its severity and confidence) and the unusual beaconing activity with a score of 0.75 (again, reflecting a combination of its severity and confidence), and an overall score (combining the component scores) of 0.40 confidence of a suspicious callback. Furthering the example, the behavioral correlation module 218 may also receive further evidence from another detection module 306 of a potential attack in the form of a malicious IP address match in a communication from the same network device contained in another event log, and associate an overall score of 0.30 confidence of a "callback" to this single-characteristic fragment. Combining this new behavioral fragment with the prior behavioral fragments, the attack identification module 226 may use an attack profile to classify these observed IOCs as an attack in which an adversary is involved in a campaign to steal data. In arriving at this classification, the attack identification module 226 may associate an overall score of 0.90 with these three fragments, which is, in the example, above a threshold of, say, 0.85 for classifying the observed behavior as an attack. This gives a real world scenario where these different types of activities in the event logs would be correlated in order to identify an attack scenario that is in progress. It should be noted that not all of the stages need to be matched completely—just the cumulative score must exceed the required alert threshold for that attack scenario.

As just described, in some embodiments, the security monitoring computing system 100 may issue an alert when the computed cumulative score exceeds the prescribed alert threshold based on analysis of event logs collected within the computer environment 110. In some embodiments, these local results can be compared with results of analysis or analyses of event logs of other computer environments, which, though not shown in the figures, can be thought of as of a similar topology to that depicted for computer environment 110. In these embodiments, the results from the behavior correlation module or the attack identification module, including, for example, the associated behavioral fragment score and the associated attack score, may be provided to an inter-computing environment stage 300 for further analysis. Accordingly, the invention can be implemented as including a first, local computing environment analysis stage 200 of FIG. 3A and a second, inter-computing environment analysis stage 300 depicted in FIG. 3B.

The inter-computing environment analysis stage 300 includes an inter-computing environment comparison module 220 configured to compare behavioral characteristics and/or fragments associated with known attacks that have been detected in other computing environments with similar behavioral characteristics and/or fragments detected in the subject environment to further enhance identification of attacks. In many cases, the computing environments of multiple organizations, although physically and organizationally separate and distinct from one another, may have one or more common features, such as network topology, data storage schemes, operating systems used by the computing nodes of their respective computing environment, and the like, that may be susceptible to attacks. For example, the data servers for each of multiple organizations may have each adopted a common configuration paradigm due to certain recommended practices published for that type of data server. Although, this common configuration paradigm may solve several problems (e.g., performance issues, other identified attacks, etc.) with earlier published best practices, this latest best practice configuration may have generated several other weaknesses that may be susceptible to an attack using one or a combination of behavioral characteristics and/or fragments applied to those weaknesses. The inter-computing environment comparison module 220 generates a comparison profile that includes information associated with the behavioral characteristics and/or fragments that formed an attack and publishes the comparison profile to the security monitoring frameworks 104 that monitor other computing environments such that the identification of attacks in the other computing environments may be enhanced.

Certain embodiments of the present disclosure providing the inter-computing environment comparison module 220 for enhanced cross-organization attack intelligence gathering may provide an advantage in that it may find correlations across various behavioral characteristics and/or fragments that may not be evident to a human analyst and/or across many behavioral characteristics and/or fragments that would otherwise not be viewed as related when analyzed only through the operation of a single computing environment 110. That is, the analysis of behavioral characteristics and/or fragments from multiple computing environments 110 may reveal potential threats that may not be easily identified from a single computing environment 110. Additionally, it may provide a reduction of false attack indications (e.g., false negatives) or missed attacks by finding correlations with previously unknown attack profiles that are variations or partial matches to known attacks.

In a particular case in which the security monitoring computing system 102 functions as a central monitoring facility that simultaneously monitors multiple computing environments, the comparison profiles may be stored in the data source 106 and used to monitor all other computing environments. However, in other cases in which multiple security monitoring computing systems 102 are implemented for independently monitoring multiple computing environments, the inter-computing environment comparison module 220 may store the comparison profile in the data source 106 as well as transmit the comparison profiles 124 to the other security monitoring computing systems 102 as they are generated.

A learning module 222 modifies the correlation profiles 120, attack profiles 122, and ICE comparison profiles 124 (FIG. 3B) or the instructions executing the modules 216, 218, 220 (FIG. 3B) and 226, that access those profiles and "consume" or use the profile information, or both the profiles and those instructions, depending on the embodiment. The modifications are made based on historical and experiential knowledge obtained from previously identified attacks (e.g., attack scenarios 308). In one embodiment, a base profile (e.g., correlation profile and/or comparison profile) may be initially generated manually from human knowledge associated with a particular attack vector, such as by a subject matter expert who has been made aware of a particular sequence of network events that may be indicative of an attack. When placed in service, the learning module 222 may modify that base profile according to how well attacks are detected and processed by that profile. For example, if the attack identification module 226 detects a false positive event (e.g., a normal sequence of network events (e.g., normal behavioral characteristics) that are falsely flagged as forming behavioral fragments of an attack, the learning module 222 may obtain information associated with each behavioral characteristic 116 and/or fragment 118 and relax the correlation profile associated with that attack such that ensuing network events are identified as attacks with less regularity. Conversely, if an attack is found in the computing environment 110 that was not detected by the system using that profile, the learning module 222 may modify the correlation profile to be more restrictive such that ensuing network events are identified as attacks with greater regularity. That is, each correlation profile and/or comparison profile may be the result of machine learning from past repetition of the framework, or based on experiential knowledge, such as an initial set of profiles developed by analysts. In other words, these base profiles may be seeded with profiles created by developers, and expanded by further analysis of subsequent attacks on computing nodes.

An attack report generation module 228 may generate an alert or other report of an attack, and may include information regarding the behavioral characteristics and fragments associated with the attack, and, in some embodiments, the score(s) associated therewith. Moreover, a remedial action generation module 230 may be optionally deployed in some embodiments (and, for example, enabled by an administrator) to generate one or more remedial actions to mitigate the adverse effects of any identified attacks. For example, the security monitoring framework 104 may issue an alert message transmitted to administrators of the computing environment indicating that an attack has been identified, and the alert may be generated by the attack report generation module 228 or the remedial action generation module 230. As another example, the security monitoring framework 104 may trace the origin of any computing nodes associated with the attack and halt operation of those computing nodes and/or any connections formed with these computing nodes to other nodes in the computing environment until the attack has been resolved. Although only several example remedial actions have been described, it should be understood that the security monitoring framework 104 may perform any number and type of remedial actions according to the identified attack.

It should be appreciated that the modules described herein are provided only as examples, and that the application may have different modules, additional modules, or fewer modules than those described herein. For example, one or more modules as described in FIG. 2 or in FIGS. 3A and 3B may be combined into a single module. As another example, certain modules described herein may be encoded on, and executed on other computing systems, such as on one of the computing nodes 112 of the computing environment 110.

Figure 3A:
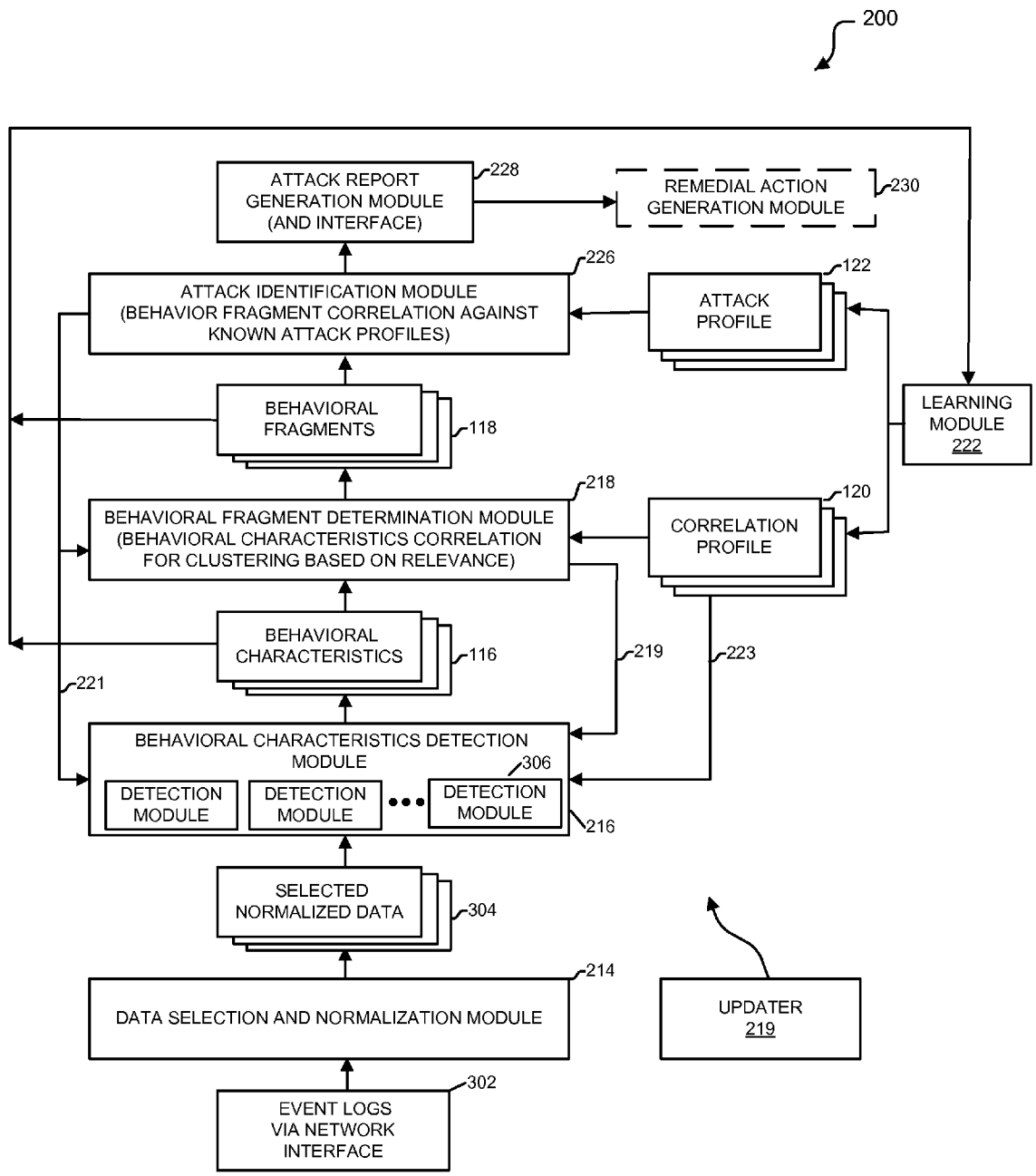
FIG. 3A illustrates a block diagram showing one example of how the security monitoring framework may be used to identify attacks according to one embodiment of the present disclosure.

FIG. 3A illustrates a block diagram showing one example of how the security monitoring framework 104 may be used to identify malicious attacks according to one embodiment of the present disclosure. It should be important to note that, although FIG. 3A illustrates one example of how attacks may be identified, other embodiments of the analytics-based security monitoring system may be embodied in different forms without departing from the spirit or scope of the present disclosure. For example, the data normalization module 214 may be omitted if normalization of the data from the computing environment is not needed or desired.

In general, the data normalization module 214 receives event logs 302 from the computing environment 110 and normalizes data associated with the event logs 302 to form normalized data 304 to be used by the behavioral characteristic detection module 216. The behavioral characteristic detection module 216 then detects various behavioral characteristics 116 which may be provided to the behavioral fragment determination module 218. The behavioral fragment determination module 218 then identifies fragments formed by the behavioral characteristics. The attack identification module 226 identifies one or more attacks based on the identified fragments; thus, the identified fragments constitute fragments of the attack. The attack report generation module 228 may issue an alert with respect to the identified attack(s), and the remedial action generation module 230 may automatically perform remedial action or report remediation recommendations to administrators. The learning module 222 may compare the results of the other modules and information from outside the local computing environment stage 200 to modify the operation of the security monitoring framework 104 for enhanced identification of ensuing attacks.

Certain of these modules may deserve additional elucidation. In one embodiment, the data normalization module 214 may filter the event logs 302 by processing only certain types of the event logs 302. For example, the data normalization module 214 may be configured to receive the event logs 302 that originate from only one or a subset of the computing nodes 112 in the computing environment 110. As another example, the data normalization module 214 may be configured to receive the event logs 302 at specified time intervals, such as during the working hours of the organization that uses the computing environment, or during other time windows which are known to be conducive to attacks. As yet another example, the data normalization module 214 may be configured to filter the event logs 302 received through a network interface using a sampling technique, such as by processing every other event such that the processed data is effectively fifty percent of its original size. As yet another example, the data normalization module 214 may be configured to filter the event logs 302 using a log class filtering process in which log files obtained from the computing environment are delineated according to classes, in which each represents a type of activity (e.g., a proxy class). In this case, the data normalization module 214 may selectively obtain certain elements of the event logs 302 according to a type of class that may be pertinent to a particular attack scenario.

In one embodiment, the behavioral characteristic detection module 216 detects the behavioral characteristics 116 using detection modules 306 configured as modular software components (e.g., plug-ins, add-ons, extensions, etc.) that may be deployed independently of the behavioral characteristic detection module 214 and/or independently of each other. The modular software components as described herein generally refer to specified segments of software code that may be added to or deleted from the system 100 on an as-needed basis. For example, an organization may have a configuration for their computing environment that is inherently susceptible to certain behavioral characteristics while being relatively immune to other behavioral characteristics. In this case, the organization may have or use only those detection modules 306 deployed that may detect those behavioral characteristics for which their computing environment is most susceptible. The detection modules 306 may be each adapted to detect a particular type of behavioral characteristic. For example, one detection module 306 may be adapted to detect a spidering sequence, while another detection module 306 is adapted to detect callback operation in the computing environment. Other module types may be implemented. Examples of such types of detection modules 306 may include, for example, those that detect account probing, account hopping, a relatively high quantity of failed authentication attempts, a relatively high quantity of successful authentication attempts, and the like.

The learning module 222 processes identified attacks 118 to modify the operation of the behavioral characteristic detection module 216, the fragment determination module 218 and the attack identification module 226 (and, in some embodiments, the inter-computing environment comparison module 220). The learning module 222 may modify the weighting factors for each of the profiles 120, 122, 124 according to the nature and extent of each detected attack. For example, the learning module 222 may receive data regarding a recently identified attack 122 that indicates that a particular behavioral characteristic or fragment was used multiple times for producing the attack. In this case, the learning module 222 may modify, eg., the attack profile 122 associated with that type of attack to include a parameter that monitors a quantity of times that the behavioral characteristic is detected such that ensuing attack attempts may be identified with a greater reliability. As another example, the learning module 222 may determine that a behavioral characteristic has been generated at a certain elapsed period of time after a previous behavioral characteristic. In this case, the learning module 222 may modify the correlation profile 120 associated therewith to increase or decrease a time window size associated with the timed sequence of each of the behavioral characteristics detected by the system.

Some embodiments may utilize feedback to improve the results of the security monitoring framework 104. For example, the behavioral fragment determination module 218 may determine that one or more behavioral characteristics are missing from a behavioral fragment and, if present, would result in a higher associated fragment score. As a result, behavioral fragment determination module 218 may generate a control signal provided over communication line or link 223 to the behavior characteristic detection module 216. The control signal may specify the missing behavioral characteristics, and cause behavior characteristic detection module 216 to re-examine the event log data at the appropriate the detection module 306. Some embodiments may also enable an analogous feedback approach from the attack identification module 226, whereby a control signal is provided is sent therefrom over communication line or link 221 to either (or both) the behavioral fragment determination module 218 to seek to determine a missing fragment in the behavioral characteristics, and/or the behavioral characteristic detection module 216 to seek to detect a missing behavioral characteristics in the received event log data. If an additional behavioral characteristic is detect, an additional behavioral fragment may be determined along with an associated fragment score. In addition, a higher characteristic and/or fragment score may be associated with detected behavioral characteristic or fragment. The end result may be a higher attack score and possibly the identification of an attack previously missed. To support this further analysis responsive to a feedback signal, the security monitoring framework 104 may be provided with an event log cache 130 (FIG. 1) to store event log data for a period of time or up to a quantity (data storage size) for later use in analysis.

Figure 3B:
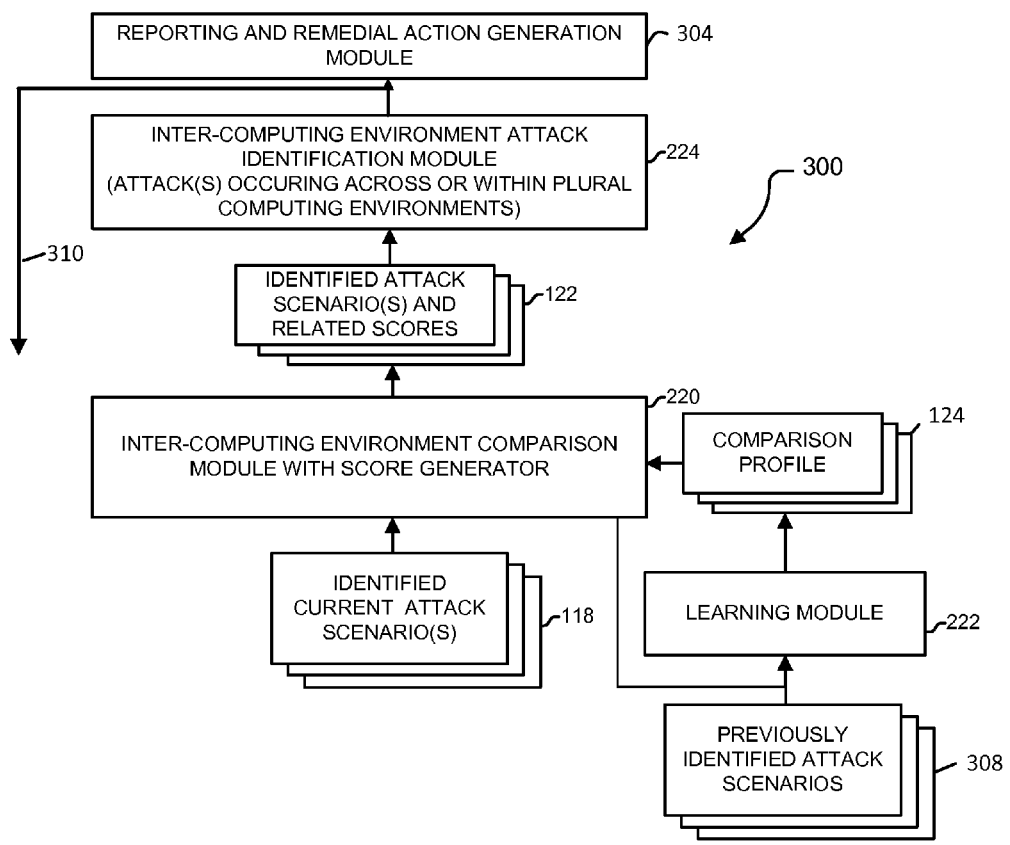
FIG. 3B illustrates a block diagram showing one example of how the security monitoring framework may be used to identify inter-computing environment attacks according to one embodiment of the present disclosure.

FIG. 3B illustrates a block diagram showing one example of how the security monitoring framework 104 may be used to identify inter-computing environment attacks. It should be important to note that, although FIG. 3B illustrates one example of how inter-computing environment-based attacks may be identified, other embodiments of the analytics-based security monitoring system may be embodied in different forms without departing from the spirit or scope of the present disclosure. For example, the inter-computing environment comparison module 220 may also be omitted if not needed or desired.

In general, the inter-computing environment comparison module 220 identifies inter-computing environment-based attacks by comparing the correlated behavioral characteristics 116 against comparison profiles 122 including information associated with one or more other attacks 118 identified in other computing environments. Other embodiments may use correlation analysis that is more complex than the simpler comparison analysis depicted and described. The identified attack scenarios and their related scores 122 from the ICE comparison module 220 are provided to the ICE attack identification module 224, which determines whether a set of ICE attacks occurred across or within plural computing environments based on the received scores (relative to one or more thresholds). The inter-computing environment attacks may provide a greater level of confidence that a malicious attack exists in a local computing environment (as determined by an associated local computing environment stage 200) due to analysis of (and match or similarity to) attacks identified in other computing environments.

In some embodiments, the ICE comparison module 220 and ICE attack identification module 224 may be executed on a security monitoring computing system 102 that is external to multiple local computing environments to which they may be coupled operationally by a network, and may continually compare attacks, e.g., from different organizations served by those local computing environments to enhance the detection of malware from each. For example, the security monitoring framework 104 may be provided as a cloud-based service to the multiple organizations. As such, a separate security monitoring framework 104 may monitor the computing environment of each organization for malware externally and independently of each other. In the event that a particular attack is detected in the local computing environment of one organization, the learning module may generate a new comparison profile 124 and/or modify an existing comparison profile 124 that includes behavioral characteristic and/or fragment information associated with that attack such that, if relatively similar behavioral characteristics are detected in the computing environment of a different organization, an inter-computing environment-based attack profile 122 may be identified, from which remedial action may be obtained.

The inter-computing environment comparison module 220 identifies one or more inter-computing environment-based attack scenarios that may be used to perform remedial actions via the reporting and remedial action generation module 304 and/or provide information to the learning module 222 (if located in the ICE computing environment or to each learning module 222, depending on the embodiment) for modifying the operation of the security monitoring framework 104 for enhanced identification of ensuing attacks. The learning module 222 then modifies the ICE comparison profiles 124 used by the behavioral characteristic comparison module 220 according to historical knowledge obtained from previously from identified attacks (e.g., attack scenarios 308). In some embodiments, the ICE attack identification module 224 from one or more other computing environments may trigger a control signal over communication line or other link 310 to seek additional behavioral characteristics or fragments (analogous to communication link 219 or 221) in one or more of the local computing environments, which may yield higher local attack scores, identify attacks not previously detected locally and provide additional threat intelligence regarding the local attack and, in some cases, the ICE attacks.

Embodiments of the present disclosure may provide a malware detection system that provides certain benefits associated with conventional anomaly-based detection approaches while operating more efficiently than these conventional approaches. For example, while anomaly-based detection techniques may provide limited detection capability for attack scenarios not provided by signature-based systems (e.g., zero-day attacks, previously unidentified malware, etc.), they do not scale well with relatively large computing environments where that typically generate and/or consume data at Tera-byte levels, which have been shown to be generally unwieldy for malware detection. Certain embodiments of the present disclosure may provide a solution to this problem by functioning as a filtering mechanism in which data to be processed is reduced along each step of the process such that relatively large computing environments may be efficiently monitored on a continual basis.

In a particular example, in each step through the process described in conjunction with FIGS. 3A and 3B, each module (e.g., data normalization module 214, behavioral characteristic detection module 216, behavioral fragment determination module 218, attack identification module 226 and inter-computing environment comparison module 220) serves to reduce (e.g., filter) the amount of data that is to be processed for identifying attacks. For example, while the event logs 302 obtained from the computing environment may be received in a Giga-byte-per-second range, normalized data 304 may be generated that is only in the mega-byte-per-second range. Additionally, the behavioral characteristic correlation module 218 may provide data that has been further filtered to be generated in the Kilo-byte-per-second range. Thus, it can be seen that the security monitoring framework 104 may perform processing of the event logs 302 by filtering data associated with the event logs 302 to provide an amount of data that is manageable for identifying attacks in the computing environment.

Figure 4:
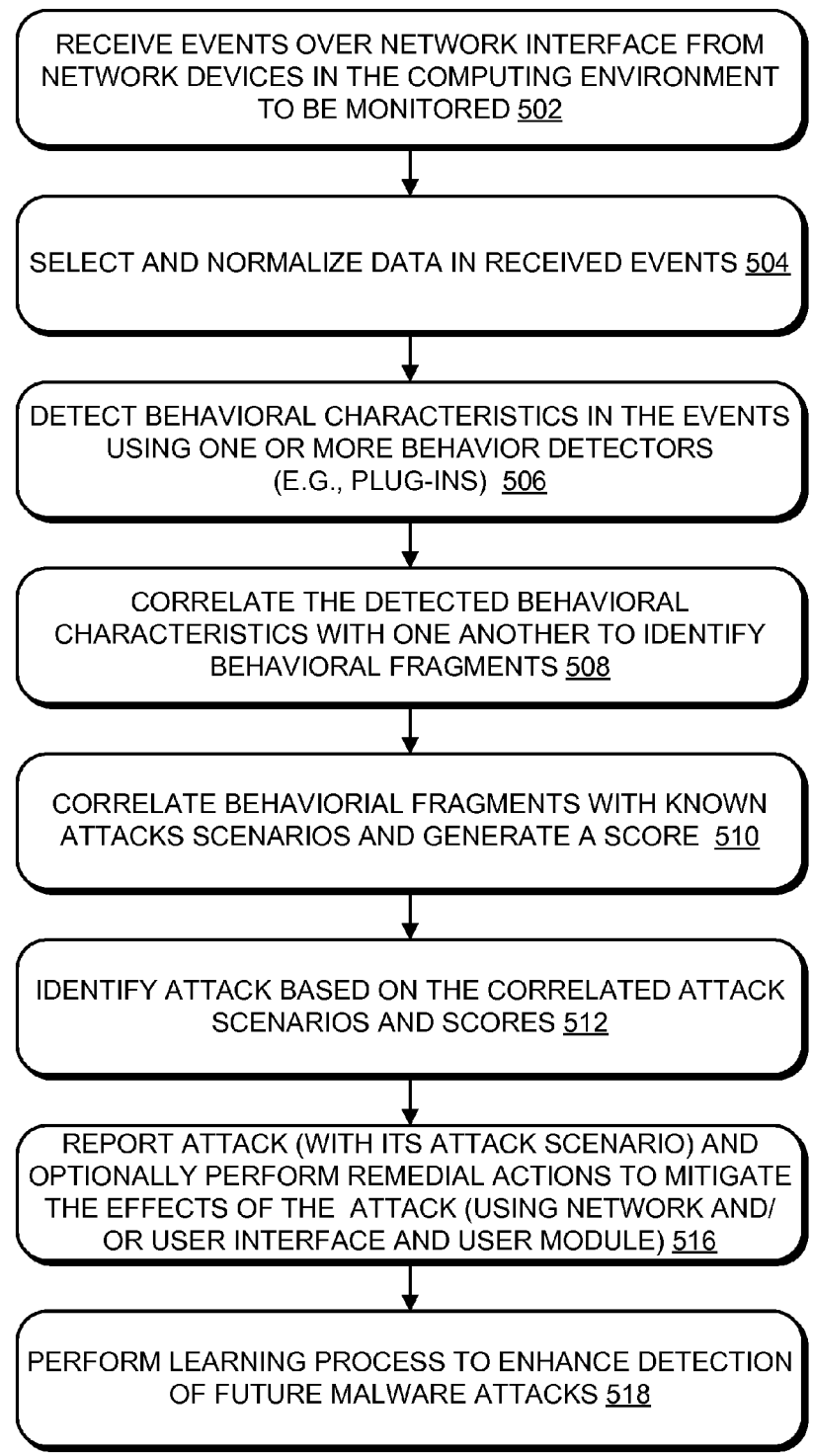
FIG. 4 illustrates an example process that is performed by the security monitoring framework according to one embodiment of the present disclosure.

FIG. 4 illustrates an example process that may be performed by the security monitoring framework 104 for identifying attacks in a computing environment according to one embodiment of the present disclosure.

In step 502, the security monitoring framework 104 receives event logs that are transmitted through a computing environment. The event logs may include all data or only a portion of the data transmitted through the computing environment. For example, the security monitoring framework 104 may be configured to receive data from certain threat regions of the computing environment, such as one or several computing nodes 112 that are suspected to be originators of illicit activity. As another example, the security monitoring framework 104 may be configured to receive data from certain sub-network portions of the computing environment, such as one that conveys financial communications for the organization that uses the computing environment.

In step 504, the security monitoring framework 104 pre-processes the received event logs to select and normalize the data to facilitate further processing and analysis.

In step 506, the security monitoring framework 104 detects behavioral characteristics from the received event logs. In one embodiment, the security monitoring framework 104 detects the behavioral characteristics using independently deployable modules that are each configured for detecting a separate behavioral characteristic. For example, one module may be configured for detecting a spidering event, a second module may be configured to detect a hopping event, while a third module may be configured to detect an account probing event. Each module may include weighting factors that may be applied to one or more parameters associated with the event logs according to the relevance of each parameter. For example, one particular behavioral characteristic, such as a spidering event, may involve a number of attempted connections the quantity of which may have a relatively high degree of relevance. Thus in this case, the quantity of attempted connections parameter of the spidering module may be configured with a relatively higher valued weighting factor to account for this degree of relevance, whereas other parameters, such as the time of day and/or the portion of the network that the spidering event originated that may not be as important, may be given relatively lower weighting factor values.

In step 508, the security monitoring framework 104 correlates the detected behavioral characteristics with a correlation profile 120 stored in the data source 106 to identify a set of related behavioral characteristics called behavioral fragments. In one embodiment, the security monitoring framework 104 may generate a score indicating a likelihood that the correlated behavioral characteristics are indeed related or relevant to one another. Each correlation profile 120 may include one or more behavioral characteristic pattern each having a weighting factor for corresponding parameters associated with the relevance of the behavioral characteristics that may be used to tailor the score generated for each sequence of behavioral characteristics by the security monitoring framework 104.

In step 510, the security monitoring framework 104 correlates the determined behavioral fragments with those set out in an attack profile for known attack scenarios and generates an associated score to reflect the likelihood of an attack. If the associated score is above a threshold, the determined behavioral fragments may be regarded as fragments of an attack. If below the threshold, the analysis may proceed or the behavioral characteristics may be regarded as benign and not indicative of an attack, depending on the embodiment.

In step 512, the security monitoring framework 104 compares the determined behavioral fragments with one or more attacks detected in other computing environments according to their similarity to one another. For example, the security monitoring framework 104 may analyze an attack detected in another computing environment to determine any behavioral characteristics or fragments that may have contributed to the attack, and generate a comparison profile 122 for comparison with a similar set of behavioral characteristics in the present computing environment. In one embodiment, the security monitoring framework 104 may be configured with one or more filtering rules to ensure that proprietary data associated the identified attack from a foreign computing environment is not inadvertently transmitted to the native network, thus causing a breach of privacy. Nevertheless, it should be appreciated that step 408 may be omitted if comparison of attacks from other computing environments with those of the present computing environment is not needed or desired.

The security monitoring framework 104 may increase or decrease the attack score according to the similarity of the identified attack with the correlated behavioral fragments. Those correlated behavioral fragments having a relatively high score may be identified as attacks, while those having a lower score may be discarded as not being attacks. In one embodiment, the security monitoring framework 104 may compare the derived score against a threshold value to determine whether or not the correlated behavioral characteristics constitute an actual attack. Additionally, the threshold value may be adjusted according to the learning module 222 that may modify (e.g., tune or otherwise adjust) the threshold value based on previously identified attacks 308.

In step 516, the security monitoring framework 104 performs one or more remedial actions according to the identified attack. For example, the security monitoring framework 104 may issue an alert message transmitted to administrators of the computing environment indicating that an attack has been identified. As another example, the security monitoring framework 104 may trace the origin of any computing nodes associated with the attack and halt operation of those computing nodes and/or any connections formed with these computing nodes to other nodes in the computing environment until the attack has been resolved. Although only several example remedial actions have been described, it should be understood that the security monitoring framework 104 may perform any number and type of remedial action according to the identified attack.

As such, embodiments of the present disclosure may provide use as an intrusion detection system (IDS) that detects the presence of malware as well as an intrusion prevention system (IPS) that may prevent certain forms of malware from entering into areas of the computing environment and/or completing attack objectives. Given the knowledge obtained about various attack vectors that are involved in the attack (e.g., which nodes, services, processes, users, etc.), the security monitoring framework 104 may function as an IPS to perform one or more remedial actions for inhibiting attack vectors in the computing environment. Such remedial actions may include, for example, quarantine/isolation, disablement, segregation, disinfection, communication restriction, privilege change, and the like. Additionally, embodiments of the present disclosure may provide a forensic platform for analysis of attacks.

In step 518, the security monitoring framework 104 performs a learning process for modifying how future attacks may be identified. The security monitoring framework 104 may analyze the identified attack to determine any parameters that may be associated with each behavioral characteristic or the relationship of one behavioral characteristic to another. Once the identified attack is analyzed, the security monitoring framework 104 may then modify parameters associated with detection of behavioral characteristics, correlation of the behavioral characteristics, determination of behavioral fragments, and/or how the correlated behavioral fragments are compared against similarly identified attacks pursuant to the attack profile or from other computing environments for enhanced identification of future attacks.

The steps described above may be repeated for detection of other attacks. Nevertheless, when displaying converged views of converged infrastructures 104 is no longer needed or desired, the process ends.

Some embodiments of the invention entail a multilevel analysis as described above. These may be implemented in a number of alternatively ways, one of which is as follows:

Level 0: Receive behavior data of one or more event logs of network devices in a computing environment via a network interface and store the received data in a behavior data cache.

Level 1: Select, filter and normalize the received behavior data, for example, by a data selection and normalization module.

Level 2: Detect behavioral characteristics in the selected, normalized behavioral data, for example, by a behavioral characteristic detection module, which may generate a score for each based on behavioral profiles of known distinguishers of the behavior data. The behavioral characteristic detection module may include a plurality of data modules of a distributed real-time computation system.

Level 3: Determine behavioral fragments or clusters by a behavioral characteristic correlation module configured to correlate the behavioral characteristics with one another to identify a set of related or mutually relevant behavioral characteristics (fragments or clusters) based on correlation profiles of known suspicious fragments and generate a score for each fragment. In some embodiments, this level may also employ a control signal over a feedback line or link from the behavioral characteristic correlation module to the behavioral characteristic detection module to discover behavioral characteristics that may be missing in identified behavioral fragments based on the fragment profiles and thereby, if found, increase the score.

Level 4: Identify an attack by an attack identification module by comparing or correlating the one or more attack fragments with past attack profiles, and generate a score for the attack based on known attack profiles related to the probability of the attack having occurred (as evidenced by the received event log data), where a set or pattern of behavioral fragments is classified as an attack if the score is above a threshold. The attack identification module may use a scoring/weighting technique to associate each behavioral fragment or each behavioral characteristic with a score, weighted appropriately based on experiential knowledge with respect to past attacks.

Level 5: Compare or correlate a set or pattern of behavioral fragments detected in a first computing environment (e.g., with an associated score above a threshold) with one or more patterns of behavioral fragments detected in one or more other computing environments to detect either (i) the same or similar behavioral fragments in the one or more other computing environments or (ii) behavioral characteristics across plural computing environments that correlate to form behavioral fragments. In some embodiments, where a high correlation is computed though an attack is not identified in at least one of the computing environments, re-performing the associated detection/analysis to seek specifically one or more characteristics or fragments in the received data that was not detected or clustered previously into a fragment.

Level 6: Classify the detected behavioral fragments as an attack occurring within each of a plurality of computing environments or as components parts of a single attack occurring across a plurality of computing environments.

Although this specification and accompanying figures describe one or more examples of a process that may be performed by the security monitoring framework 104 for identification and/or remediation of attacks, the features of the disclosed process may be embodied in other specific forms without deviating from the spirit and scope of the present disclosure. For example, the security monitoring framework 104 may perform additional, fewer, or different operations than those operations as described in the present example. As another example, the steps of the process described herein may be performed by a system other than the security monitoring computing system 102, which may be, for example, one of the computing nodes 112 in the computing environment 110.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic device) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

A machine readable medium includes any mechanism for storing or transmitting information in a form (e.g., software, processing application) readable by a machine (e.g., a computer). Such media may take the form of, but is not limited to, nonvolatile media and volatile media. Nonvolatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An analytics-based security monitoring system comprising:
   at least one memory to store instructions; and
   a hardware processor communicatively coupled to the at least one memory, the hardware processor, when executing the instructions, to:
      receive information collected from at least one computing node in a computing environment,
      detect a first plurality of behavioral characteristics from behavioral data in the received information, each of the first plurality of behavioral characteristics representing an action conducted in the computing environment,
      determine one or more behavioral fragments, each of the one or more behavioral fragments comprises a second plurality of behavioral characteristics having a level of relevance to each other that is computed based, at least in part, on one or more of (i) whether the second plurality of behavioral characteristics occur within a prescribed window of time or (ii) whether the second plurality of behavioral characteristics are detected on a single computing node or different computing nodes of the at least one computing node,
      correlate the one or more determined behavioral fragments against an attack profile comprising a plurality of sets of behavioral fragments where each set of behavioral fragments forms a malicious behavior pattern of a known attack,
      identify an attack based on the correlated one or more determined behavioral fragments, and
      perform one or more remedial actions when the attack is identified.

2. The analytics-based security monitoring system of claim 1, wherein the instructions are further executed by the hardware processor to:
   identify the attack by generating a score based on the correlated one or more determined behavioral fragments.

3. The analytics-based security monitoring system of claim 1, wherein the instructions are further executed to:
   correlate a first behavioral characteristic against one or more other behavioral characteristics;
   generate a behavioral score indicative of a level of relevance of the first behavioral characteristic to the one or more other behavioral characteristics using at least one correlation weighting factor applied to the first behavioral characteristic and the one or more other behavioral characteristics; and
   identify the attack by generating a score based on the correlated one or more determined behavioral fragments.

4. The analytics-based security monitoring system of claim 3, wherein the instructions are further executed by the hardware processor to perform a learning process that includes analyzing a previously identified attack, and modifying the at least one correlation weighting factor according to the analyzed attack.

5. The analytics-based security monitoring system of claim 1, wherein the instructions are further executed by the hardware processor to detect the plurality of behavioral characteristics using one or more detection weighting factors that are applied to the behavioral data of received information.

6. The analytics-based security monitoring system of claim 1, wherein the instructions are further executed by the hardware processor to identify an inter-computing environment-based attack by comparing the one or more determined behavioral fragments against a profile including information associated with one or more other attacks identified in other computing environments.

7. The analytics-based security monitoring system of claim 6, wherein the instructions are further executed by the hardware processor to perform a learning process that includes analyzing the one or more other attacks, and modifying a similarity weighting factor of the profile according to the one or more other attacks.

8. The analytics-based security monitoring system of claim 1, wherein the level of relevance is further based on at least whether the second plurality of behavioral characteristics arose during processing of a particular object or a particular type of object.

9. The analytics-based security monitoring system of claim 1, wherein the instructions are further executed by the hardware processor to normalize data associated with the received information into a common format prior to detecting the plurality of behavioral characteristics.

10. The analytics-based security monitoring system of claim 9, wherein the normalized data has a reduced size relative to the data associated with the received information.

11. The analytics-based security monitoring system of claim 1, wherein each of the behavioral characteristics is associated with criteria comprising at least one of a known illicit behavior, a quantity of failed authentication attempts, a quantity of successful authentication attempts, a type of authentication attempt, a data transmission technique, an elapsed time between first and second behavioral characteristics, a reordering of third and fourth behavioral characteristics, and a network searching technique.

12. The analytics-based security monitoring system of claim 1, wherein the remedial action comprises at least one of generating an alert message, tracing an origin of one or more computing nodes associated with the attack, and halting operation of the one or more computing nodes associated with the attack.

13. An analytics-based security monitoring method comprising:
   receiving, using an operations management application with instructions stored on a non-transitory medium and executed on at least one processor, information collected from at least one computing node in a computing environment;
   detecting, using the instructions, a plurality of behavioral characteristics from the received information, each of the plurality of behavioral characteristics representing an action conducted in the computing environment;
   identifying, using the instructions, at least one behavioral fragment comprising one or more of the detected behavioral characteristics that are related by correlating the behavioral characteristics against a correlation profile including information associated with a set of behavioral characteristic that form a behavior pattern, the related behavioral characteristics are determined based, at least in part, on (i) whether the behavioral characteristics occur within a prescribed window of time or (ii) whether the behavioral characteristics are detected on a single computing node or different computing nodes of the at least one computing node;

identifying, using the instructions, an attack comprising the at least one behavioral fragment by correlating the at least one behavioral fragment against an attack profile including information associated with a set of behavioral fragments that form an attack pattern; and performing, using the instructions, one or more remedial actions when the attack is identified, the one or more remedial actions including reporting the attack.

14. The analytics-based security monitoring method of claim 13, further comprising:
identifying the attack by generating an attack score based on the correlated one or more determined behavioral fragments.

15. The analytics-based security monitoring method of claim 13, further comprising:
correlating a first behavioral characteristic against one or more other behavioral characteristics;
generating a behavioral characteristic score indicative of a level of relevance of the first behavioral characteristic to the one or more other behavioral characteristics using at least one correlation weighting factor applied to the first behavioral characteristic and the one or more other behavioral characteristics; and
identify the attack by generating an attack score based on the correlated one or more determined behavioral fragments.

16. The analytics-based security monitoring method of claim 15, further comprising performing a learning process that includes analyzing a previously identified attack, and modifying the at least one correlation weighting factor according to the analyzed attack.

17. The analytics-based security monitoring method of claim 16, further comprising: detecting the plurality of behavioral characteristics using one or more detection weighting factors with respect to behavioral data of the received information.

18. The analytics-based security monitoring method of claim 16, further comprising performing a learning process that includes analyzing a previously identified attack, and modifying the correlation weighting factors according to the analyzed attack.

19. The analytics-based security monitoring method of claim 14, further comprising identifying an inter-computing environment-based attack by comparing the correlated behavioral fragments against a profile including information associated with one or more other attacks identified in other computing environments.

20. The analytics-based security monitoring method of claim 19, further comprising performing a learning process that includes analyzing the other attacks, and modifying a similarity weighting factor of the profile according to the analyzed other attacks.

21. A security monitoring system comprising:
a security monitoring framework stored in at least one memory and executed on at least one processor of a computing system, the security monitoring framework comprising:
a behavioral characteristic detection module that, when executed by the at least one processor, analyzes data in an event log to detect a plurality of behavioral characteristics from the event log data collected from at least one computing node in a computing environment, each of the plurality of behavioral characteristics representing an action conducted in the computing environment;
a behavioral fragment determination module that, when executed by the at least one processor, correlates a first of the detected behavioral characteristics against at least one other of the detected behavioral characteristics, and a second of the detected behavioral characteristics against at least one other of the detected behavioral characteristics, using a correlation profile to identify thereby respective first and second behavioral fragments, the correlation profile includes factors including whether the first of the detected behavioral characteristics and the at least one other of the detected behavioral characteristics occur within a prescribed period of time;
an attack identification module that, when executed by the at least one processor, identifies an attack by correlating the first and second behavioral fragments against an attack profile including information associated with a plurality of sets of behavioral fragments that each form a malicious behavior pattern of the attack; and
a remedial action generation module that, when executed by the at least one processor, performs one or more remedial actions when the attack is identified.

22. The security monitoring system of claim 21, wherein the behavioral fragment determination module is further configured to provide a control signal to the behavioral characteristic detection module to cause the behavioral characteristic detection module to re-analyze the event log data to detect, based on a fragment profile, a behavioral characteristic that was not detected when the event log data was analyzed previously.

23. The security monitoring system of claim 21, wherein the attack identification module is further configured to provide a control signal to the behavioral characteristic detection module to cause the behavioral characteristic detection module to re-analyze the event log data to detect, based on a fragment profile, a behavioral characteristic that was not detected when the event log data was analyzed previously.

24. The security monitoring system of claim 21, wherein the attack identification module is further configured to provide a control signal to the behavioral fragment determination module to cause the behavioral fragment determination module to re-correlate the behavioral characteristics based on the attack profile, to determine either a third behavioral fragment constituting part of the attack or an additional behavioral characteristic that was previously omitted from the first and second behavioral fragments.

25. Computer program product code implemented in a non-transitory, computer readable medium that when executed by at least one processor, is operable to perform at least the following:
receiving, using an operations management application with instructions stored on a non-transitory medium and executed on at least one processor, information collected from at least one computing node in a computing environment;
detecting, using the instructions, a plurality of behavioral characteristics from the received information, each of the plurality of behavioral characteristics representing an action conducted in the computing environment;
determining, using the instructions, a behavioral fragment by correlating a first of the detected behavioral characteristics against at least one other detected behavioral characteristic, and a second of the detected behavioral characteristics against at least one other of the detected behavioral characteristics, using a correlation profile to thereby identify respective first and second behavioral fragments, the correlation profile includes factors including whether the first of the detected behavioral characteristics and the at least one other detected behavioral characteristic occur within a prescribed period of time;
identifying, using the instructions, an attack by correlating the first and second behavioral fragments against an attack profile including information associated with a plurality of sets of behavioral fragments that each form a malicious behavior pattern of the attack; and
performing, using the instructions, one or more remedial actions when the attack is identified.

* * * * *